(12) United States Patent
Xiao et al.

(10) Patent No.: US 8,030,935 B2
(45) Date of Patent: Oct. 4, 2011

(54) MINIMIZING THE EFFECT OF BOREHOLE CURRENT IN TENSOR INDUCTION LOGGING TOOLS

(75) Inventors: Jiaqi Xiao, Houston, TX (US); Li Gao, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 662 days.

(21) Appl. No.: 10/965,997

(22) Filed: Oct. 15, 2004

(65) Prior Publication Data
US 2006/0082374 A1 Apr. 20, 2006

(51) Int. Cl.
*G01V 3/10* (2006.01)
(52) U.S. Cl. ............ 324/338; 324/343; 702/7; 703/5
(58) Field of Classification Search .......... 324/338, 324/343; 702/6, 7
See application file for complete search history.

(56) References Cited

U.S. PATENT DOCUMENTS

| | | | | |
|---|---|---|---|---|
| 5,041,975 A | 8/1991 | Minerbo et al. | | 364/422 |
| 5,065,099 A | * 11/1991 | Sinclair et al. | | 324/339 |
| 5,157,605 A | 10/1992 | Chandler et al. | | 364/422 |
| 5,200,705 A | 4/1993 | Clark et al. | | 324/338 |
| 5,329,448 A | 7/1994 | Rosthal | | 364/422 |
| 5,339,037 A | 8/1994 | Bonner et al. | | 324/366 |
| 5,463,320 A | 10/1995 | Bonner et al. | | 324/366 |
| 6,216,089 B1 | * 4/2001 | Minerbo | | 702/7 |
| 6,297,639 B1 | 10/2001 | Clark et al. | | 324/338 |
| 6,304,086 B1 | 10/2001 | Minerbo et al. | | 324/338 |
| 6,351,127 B1 | 2/2002 | Rosthal et al. | | 324/338 |
| 6,373,254 B1 | 4/2002 | Dion et al. | | |
| 6,380,744 B1 | 4/2002 | Clark et al. | | 324/338 |
| 6,393,364 B1 | * 5/2002 | Gao et al. | | 702/7 |
| 6,557,794 B2 | 5/2003 | Rosthal et al. | | |
| 6,566,881 B2 | 5/2003 | Omeragic et al. | | 324/338 |
| 6,573,722 B2 | 6/2003 | Rosthal et al. | | 324/338 |
| 6,624,634 B2 | 9/2003 | Rosthal et al. | | 324/338 |
| 6,630,830 B2 | 10/2003 | Omeragic et al. | | 324/338 |
| 6,682,613 B2 | 1/2004 | Bai et al. | | 148/624 |
| 6,690,170 B2 | 2/2004 | Homan et al. | | 324/339 |
| 6,693,430 B2 | 2/2004 | Rosthal et al. | | 324/338 |
| 6,710,601 B2 | 3/2004 | Rosthal et al. | | 324/343 |
| 2001/0004212 A1 | 6/2001 | Omeragic et al. | | 324/338 |
| 2002/0008520 A1 | 1/2002 | Clark et al. | | 324/338 |

(Continued)

FOREIGN PATENT DOCUMENTS
SU 1067457 A * 1/1984

OTHER PUBLICATIONS

Fundamentals of Applied Electromagnetics, Fawwaz T. Ulaby, pp. 192-195, 2001.*

(Continued)

*Primary Examiner* — Patrick Assouad
*Assistant Examiner* — David M. Schindler
(74) *Attorney, Agent, or Firm* — Baker Botts L.L.P.

(57) ABSTRACT

Logging tools, methods, and computer programs for use in borehole logging are described. The logging tool includes three or more tensors, each tensor including one or more coils. Each coil is characterized by coil parameters including an axis orientation, a cross-sectional area, a number of turns, and a location. At least one of the coil axes is disposed at an angle to the borehole axis. One or more of the coil parameters are selected to minimize sensitivity to borehole current.

37 Claims, 8 Drawing Sheets

U.S. PATENT DOCUMENTS

| | | | |
|---|---|---|---|
| 2002/0008521 A1 | 1/2002 | Clark et al. | 324/338 |
| 2002/0105332 A1* | 8/2002 | Rosthal et al. | 324/338 |
| 2003/0004647 A1* | 1/2003 | Sinclair | 702/7 |
| 2003/0071626 A1* | 4/2003 | Omeragic et al. | 324/338 |
| 2003/0146751 A1 | 8/2003 | Rosthal et al. | 324/338 |
| 2003/0146753 A1 | 8/2003 | Rosthal et al. | 324/346 |
| 2003/0155923 A1 | 8/2003 | Omeragic et al. | 324/338 |
| 2003/0155924 A1 | 8/2003 | Rosthal et al. | 324/366 |
| 2004/0119476 A1* | 6/2004 | Homan et al. | 324/342 |

OTHER PUBLICATIONS

International Search Report PCT/US05/36470, Sep. 29, 2006.

\* cited by examiner

410 ⟶

ADJUST ONE OR MORE COIL PARAMETERS TO SATISFY THE EQUATION:

$$\frac{N_m \cdot S_m}{Z_m^3} - \left( \frac{N_{b1} \cdot S_{b1}}{Z_{b1}^3} + \frac{N_{b2} \cdot S_{b2}}{Z_{b2}^3} + \ldots + \frac{N_{bQ} \cdot S_{bQ}}{Z_{bQ}^3} \right) = 0$$

MINIMIZING THE EFFECT OF BOREHOLE CURRENT IN TENSOR INDUCTION LOGGING TOOLS

BACKGROUND

Tensor induction tools may increase the amount of information that may be gathered during logging. Tensor induction tools with one or more elements whose magnetic axes are disposed at an angle to the borehole axis, however, may experience a borehole-current effect. The borehole-current effect refers to current induced in the borehole that distorts measurements of current induced in the formation.

BRIEF DESCRIPTION OF THE DRAWINGS

FIG. 8 is a block diagram of an example system for minimizing direct coupling between one or more transmission tensors and one or more reception tensors.

DETAILED DESCRIPTION

Figure 1:
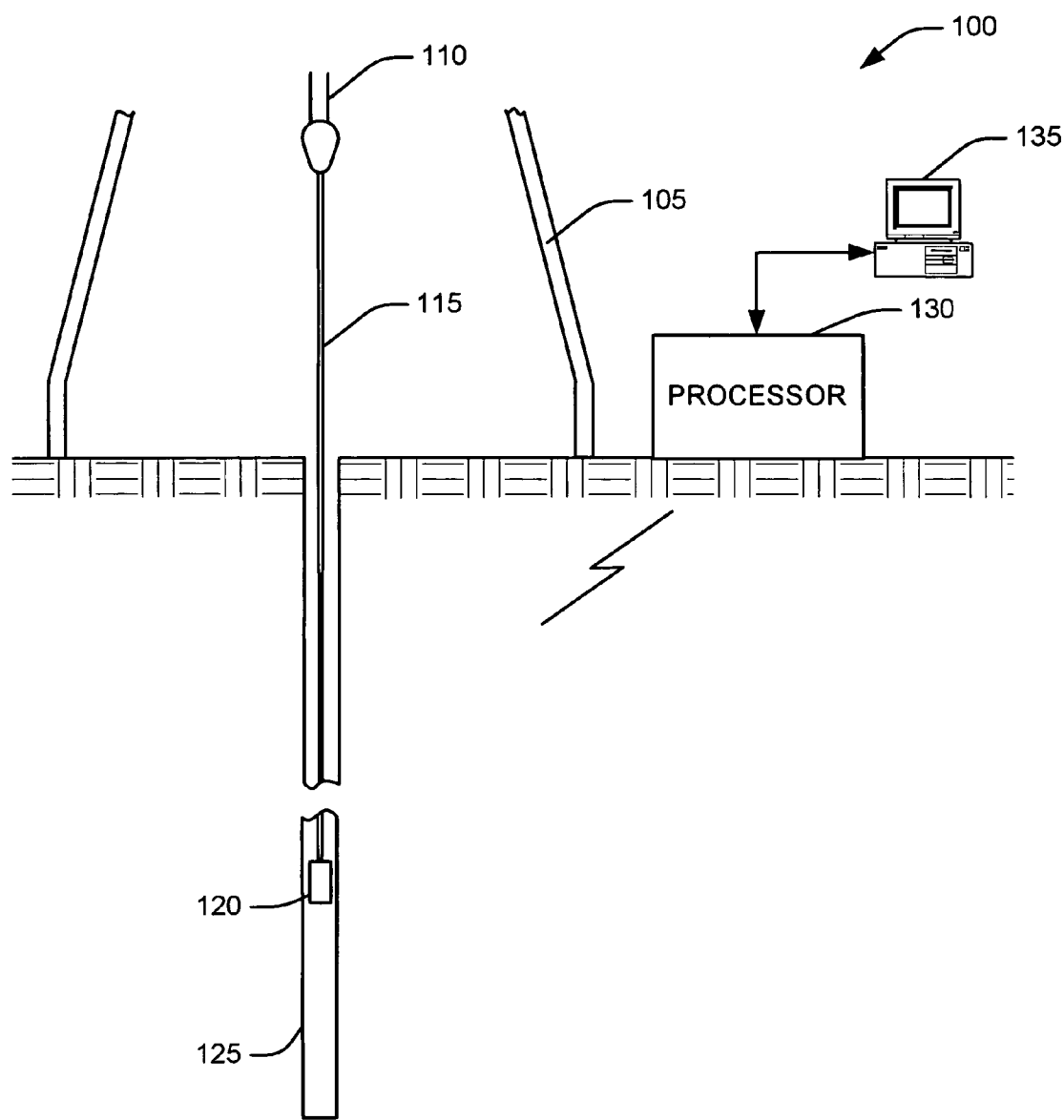
FIG. 1 shows a system for downhole logging.

As shown in FIG. 1, logging equipment 100 (simplified for ease of understanding) includes a mast 105, draw works or winch 110, wireline 115, and logging tool 120. The logging tool 120 is placed in the borehole 125 to measure one or more properties of the formation surrounding the borehole 125. The logging tool 120 may be in communication with a processor 130. The processor 130 may receive data from the logging tool 120. The processor 130 may modify, analyze, or record the data from the logging tool 120. For example, the processor 130 may be an electromechanical plotter to plot data from the logging tool 120. The processor 130 may be in communication with a terminal 135 to receive input or provide output to an operator. The processor 130 and the terminal 135 may be integrated, or they may be separate. The processor 130 may control the draw works or winch 110 to control the movement of the logging tool 120 in the borehole 125. Although FIG. 1 illustrates an example wireline system, the systems, methods, and computer programs described herein may be used in other downhole system, including, for example, logging-while drilling systems.

Figure 2:
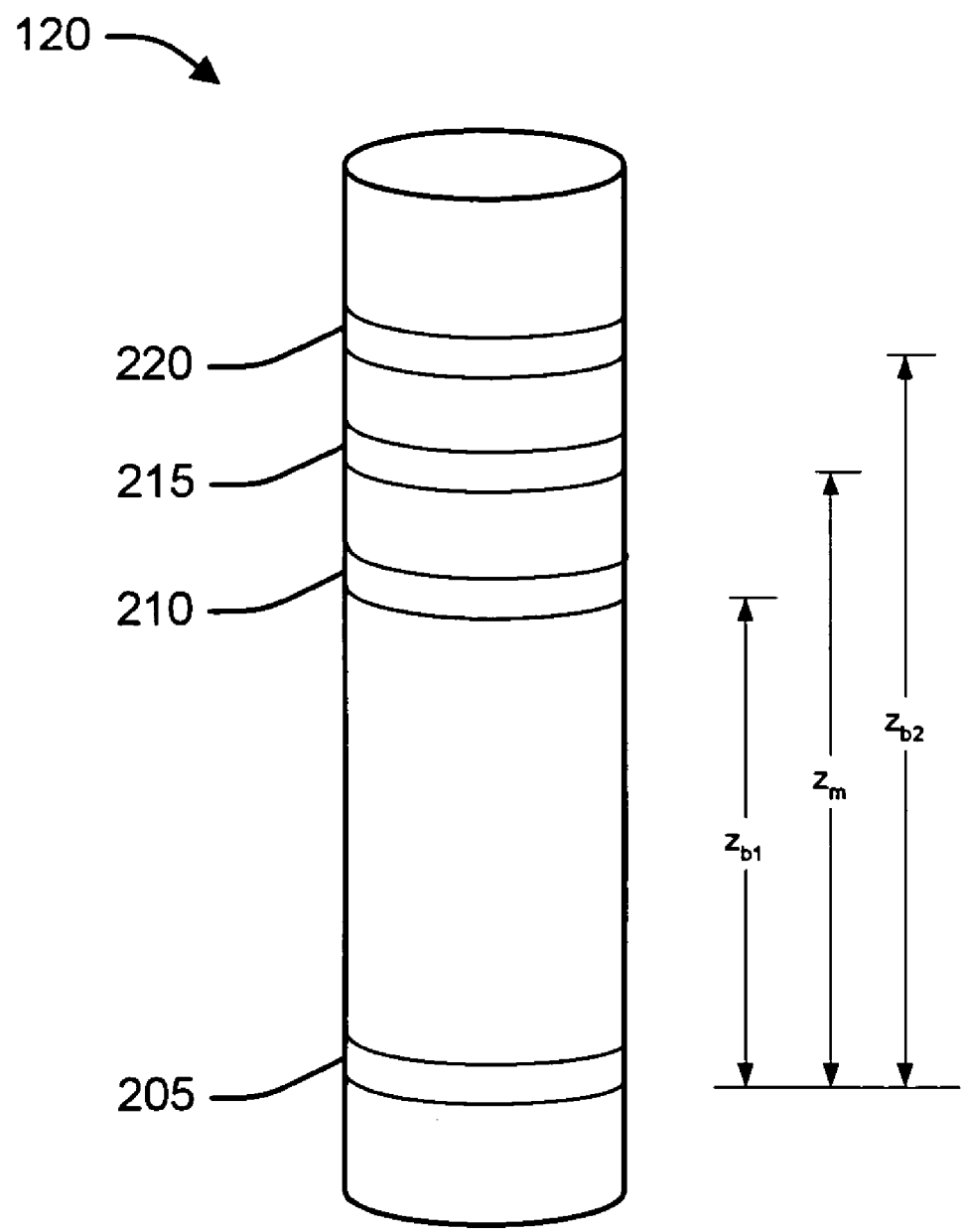
FIG. 2 shows an example logging tool.

An example logging tool 120 is shown in FIG. 2. The example logging tool 120 includes four tensors 205, 210, 215, and 220 to transmit or receive signals. One or more of the tensors 205, 210, 215, and 220 are transmission tensors for transmitting signals. One or more of the tensors 205, 210, 215, and 220 are reception tensors for receiving signals. In certain example logging tools 120, one or more of the tensors 205, 210, 215, and 220 may be transmission or reception tensors at different times. One or more of the tensors 205, 210, 215, and 220 may be joined by wiring or other circuitry to modify the signals received or transmitted by the tensors. One or more of the tensors 205, 210, 215, and 220 may be connected with one or more transmitters or receivers, which may be controlled by the processor 130.

Figure 3:
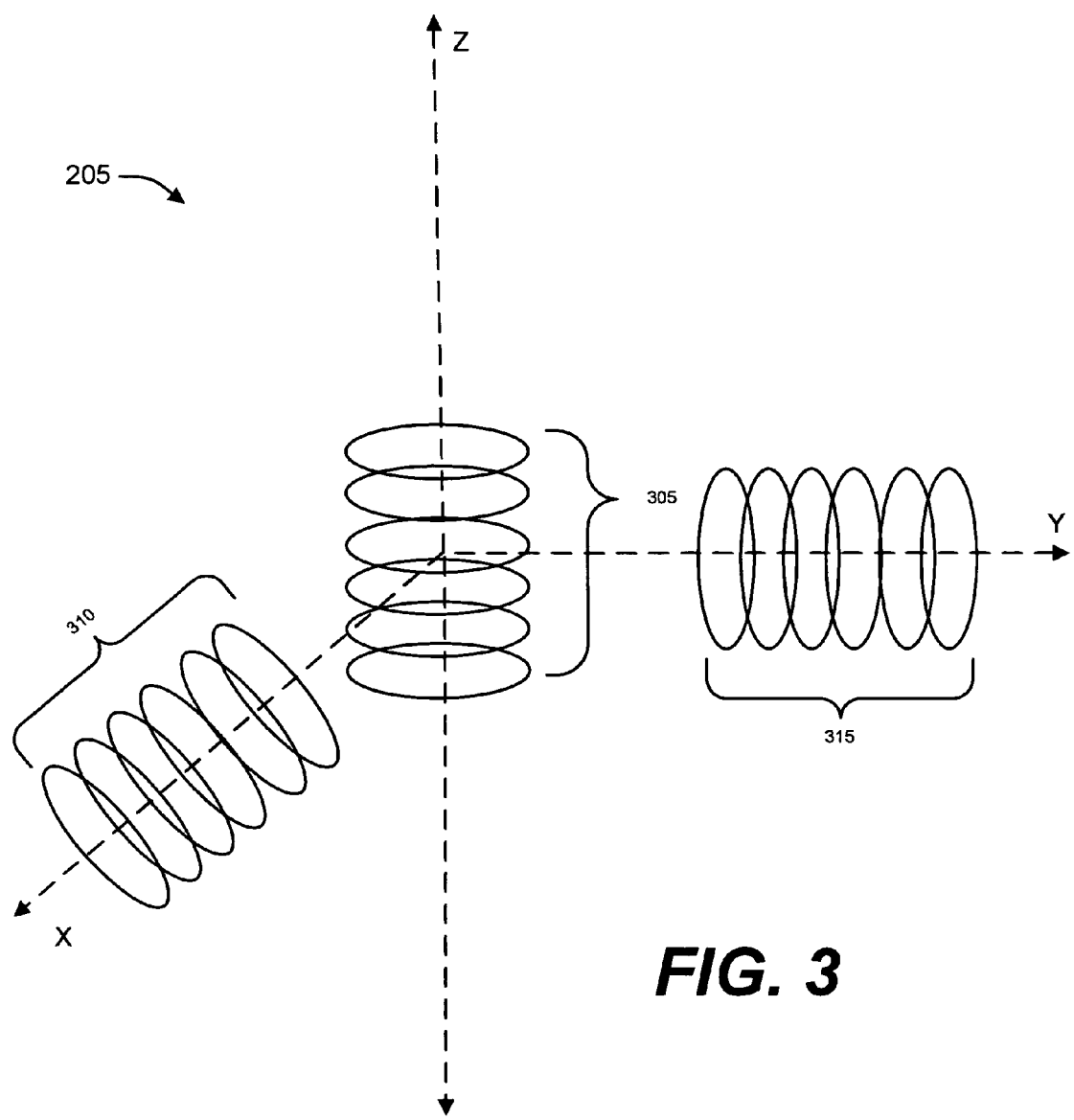
FIG. 3 shows coils within an example tensor.

Example elements within a tensor, such as tensor 205, are shown in FIG. 3. The tensor includes three coils 305, 310, and 315. Each of the coils 305, 310, and 315 may have a number of turns of wire about a core. Each of the coils 305, 310, and 315 may have a cross-sectional area. The number of turns, the cross-sectional area, and the orientation of each coil may alter the behavior of the coil in the presence of a signal. The coils 305, 310, and 315, shown in FIG. 3, are oriented mutually orthogonal to each other: the core of coil 305 is along the Z axis, the core of coil 310 is along the X axis, and the core of the coil 315 is along the Y axis. In general however, the coils 305, 310, and 315 may have a different orientation relative to each other.

Coils in reception tensors that are disposed at an angle relative to the axis of the borehole will receive a borehole signal due to the borehole current. Therefore, if tensor 205 is aligned with the borehole axis, coil 305 will not receive any borehole signal, while coils 310 and 315 will receive borehole signal because they are oriented orthogonal to the borehole axis. In practice, the tensor 205 may be disposed in the borehole 125 so that one or more of the coils 305, 310, and 315 may have a component orthogonal to the borehole axis.

Figure 4:
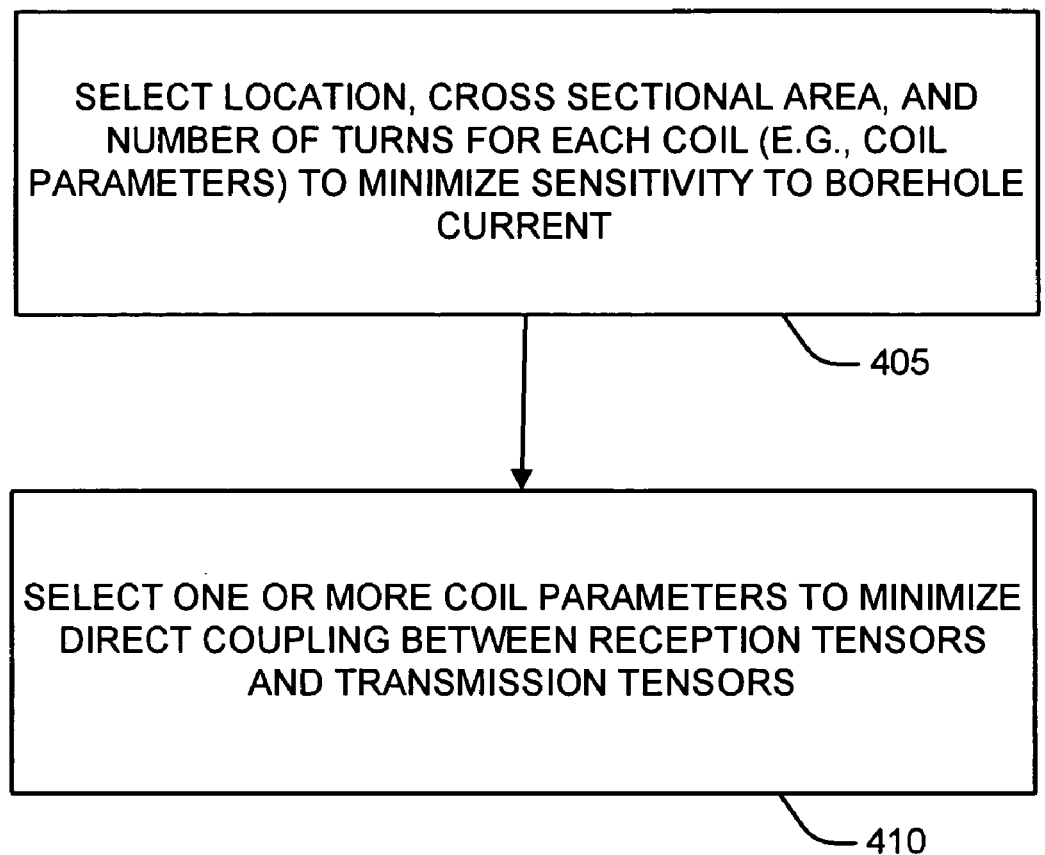
FIG. 4 is a block diagram of an example system for minimizing the effects of borehole current and direct coupling between one or more transmission tensors and one or more reception tensors.

FIG. 4 illustrates an example system for minimizing the sensitivity of logging tool 120 to borehole current. The system selects the one or more of the location, the cross sectional area, or the number of turns ("coil parameters") for each coil in the logging tool 120 to minimize the sensitivity to borehole current (block 405). The system may also select one or more of the coil parameters for each coil to minimize direct coupling between the reception tensors and the transmission tensors (block 410). In certain example implementations, blocks 405 and 410 may be performed simultaneously.

Returning to FIG. 2, in example implementations of logging tool 120 that follow, tensor 205 is a transmission tensor, while tensors 210, 215, and 220 are reception tensors. Among the reception tensors, tensor 215 is a main receiver tensor and tensors 210 and 220 are bucking tensors. The signal induced in the bucking tensors 210 and 220 may be subtracted from the signal induced in the main receiver tensor 215 by circuitry connecting the main receiver tensor 205 and the bucking tensors 210 and 220. Bucking tensor 210 may be $Z_{b1}$ away from transmission tensor 205, main receiver tensor 215 may be $Z_m$ away from transmission tensor 205, and bucking tensor 220 may be $Z_{b2}$ away from transmission tensor 205.

Figure 5:
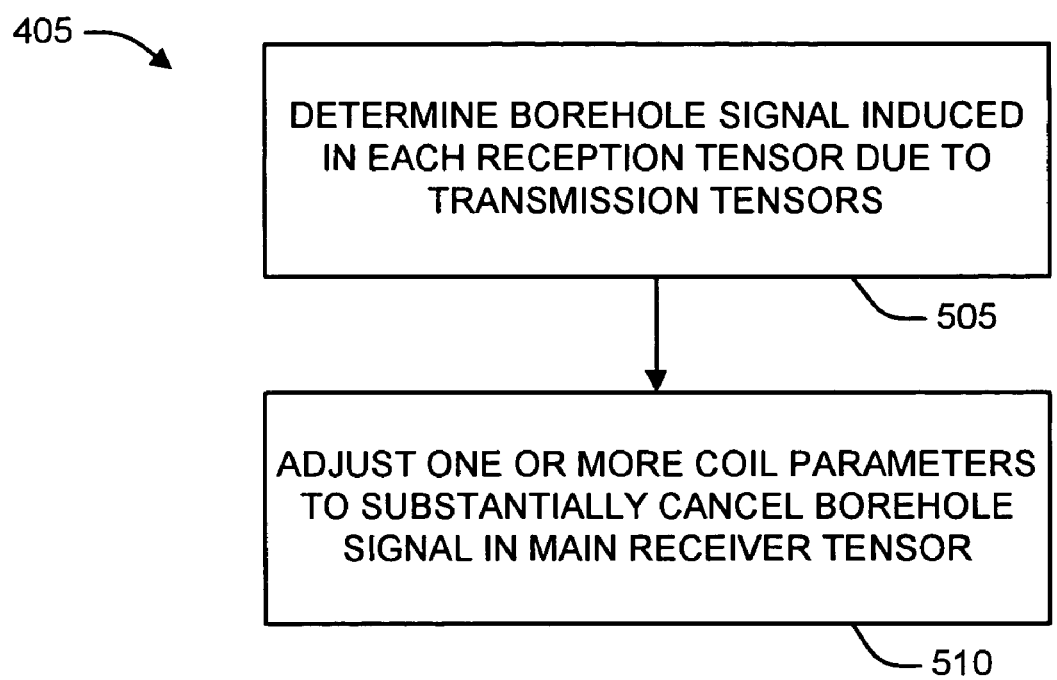
FIGS. 5-7 are block diagrams of an example system for minimizing the effects of borehole current.

An example system for selecting one or more of the coil parameters for each coil in the logging tool 120 to minimize sensitivity to borehole current (block 405) is shown in FIG. 5. The system may determine the borehole signal induced in each reception tensor due to the one or more transmission tensors (block 505). The system may then adjust one or more of the coil parameters to substantially cancel the borehole signal in the main receiver tensor 215 (block 510).

Figure 6:
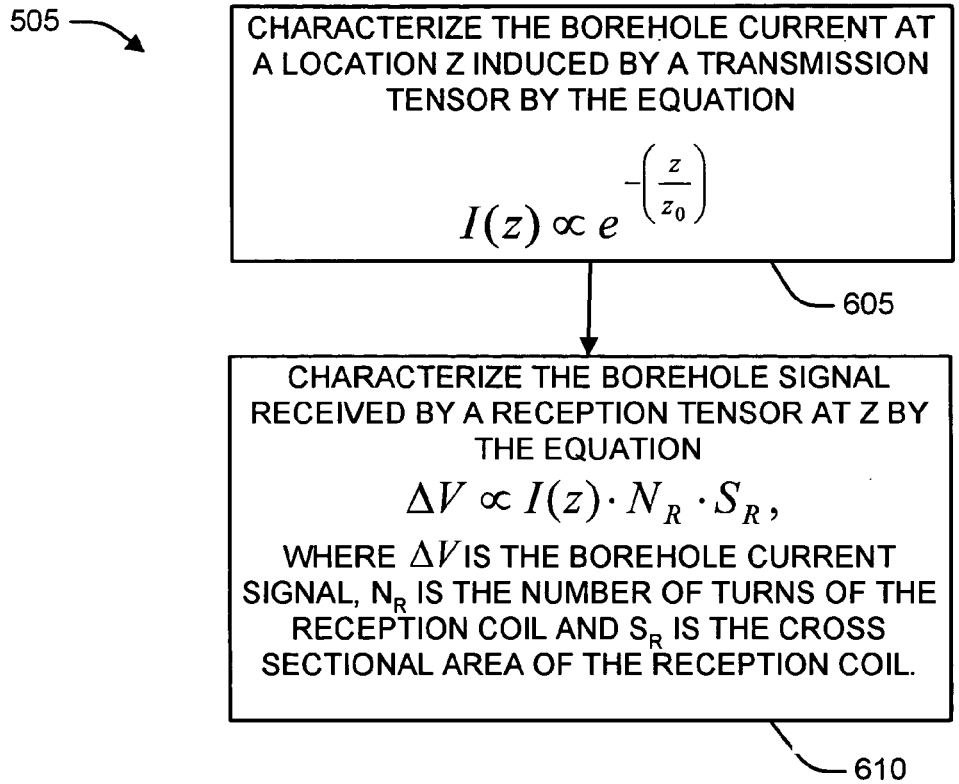

An example system for determining the borehole signal induced in each reception tensor due to the one or more transmission tensors (block 505) is shown in FIG. 6. The system may characterize the borehole current at location z that is induced by a transmission tensor, using the following equation:

$$I(z) \propto e^{-\left(\frac{z}{z_0}\right)} \qquad \text{(Equation 1)}$$

where I is the current (in Amperes), z is the distance along the borehole axis away from the transmission tensor, and $z_0$ is the characteristic length of the exponential attenuation determined by the square root of the ratio of the drilling fluid conductivity divided by the formation conductivity (block 605).

The coupling between a coil oriented orthogonal to the borehole axis and the borehole current may depend on the cross sectional area and the number of turns of the coil, and the strength of the borehole current. The borehole current, as shown above in Equation 1, may be a function of the distance z. Therefore, the signal induced in a coil oriented orthogonal to the borehole axis may be characterized by the following equation:

$$\Delta V \propto I(z) \cdot N_R \cdot S_R \qquad \text{(Equation 2)}$$

where $\Delta V$ denotes the borehole signal induced in the coil oriented orthogonal to the borehole axis, and $S_R$ and $N_R$ are the cross sectional area and the number of turns of the receiving coil, respectively (block 610). If the coil is not fully oriented orthogonal to the borehole axis, trigonometric functions may be used to determine the borehole current induced in the coil.

Figure 7:
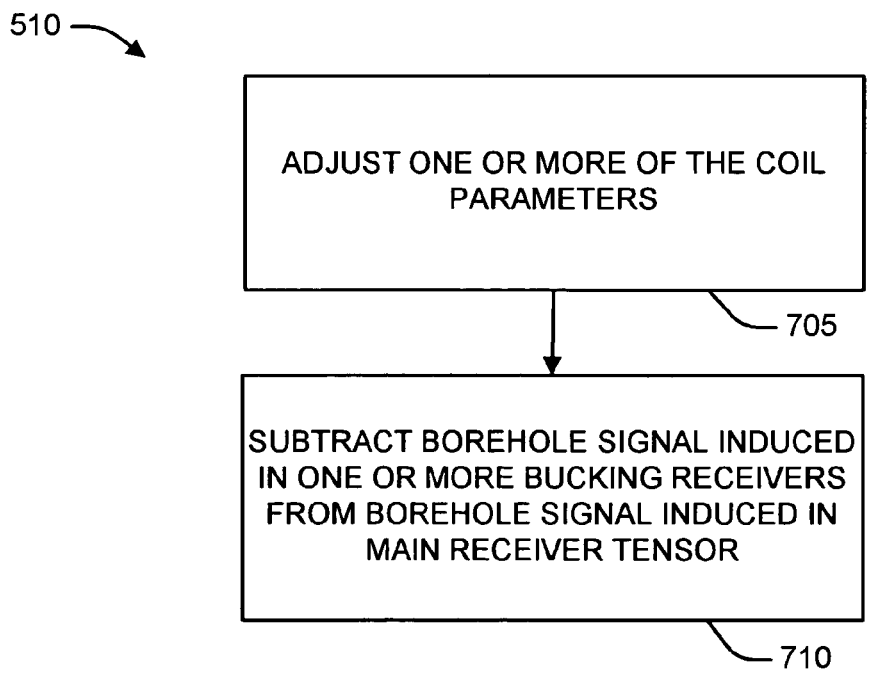

An example system for adjusting the location, cross sectional area, and number of turns of coils to substantially cancel the borehole signal in the main receiver tensor (block 510) is shown in FIG. 7. The system may adjust one or more of the location, cross-sectional area, and number of turns of the coils in one or more tensors (block 705). The system may then subtract the bore signal induced in one or more bucking receivers from the borehole signal induced in the main receiver tensor (block 710). For example, if induction tool 120 only included two reception tensors (e.g., bucking tensor 210 and main receiver tensor 215), the borehole signal induced in the reception tensors could be expressed as:

$$\Delta V \propto [I(z_m) \cdot N_m \cdot S_m - I(z_b) \cdot N_{b1} \cdot S_{b1}] \qquad \text{(Equation 3)}$$

By selecting the coil parameters the borehole signal ($\Delta V$) may be set to be zero. In such a configuration, the induction tool 120 may have no, or very little, sensitivity to the borehole current. In certain implementations, however, the coil parameters in the reception tensors may be selected to cancel out the direct coupling between the one or more transmission tensors and the one or more reception tensors (block 410).

The borehole signal generated by the borehole current in the example induction tool 120 (FIG. 2) may be expressed by the following equation:

$$\Delta V \propto [I(z_m) \cdot N_m \cdot S_m - I(z_{b1}) \cdot N_{b1} \cdot S_{b1} - I(z_{b2}) \cdot N_{b2} \cdot S_{b2}] \qquad \text{(Equation 4)}$$

where the subscripts m, b1 and b2 denote the main receiver tensor 215 and the buckling tensors 210 and 220, respectively, N denotes the number of turns in a coil, S denotes the cross-sectional area of a coil, and I denotes the borehole current induced in the coil. For this example configuration of tensors, the system may solve the following equation to minimize the borehole signal (block 505):

$$I(z_m) \cdot N_m \cdot S_m - I(z_{b1}) \cdot N_{b1} \cdot S_{b1} - I(z_{b2}) \cdot N_{b2} \cdot S_{b2} = 0 \qquad \text{(Equation 5)}$$

The system may also adjust one or more of the coil parameters to minimize direct coupling between the one or more reception tensors and the one or more transmission tensors (block 410). An example system for performing block 410 is shown in FIG. 8. The example system may adjust the coil parameters to satisfy the following equation (block 805):

$$\frac{N_m \cdot S_m}{Z_m^3} - \left(\frac{N_{b1} \cdot S_{b1}}{Z_{b1}^3} + \frac{N_{b2} \cdot S_{b2}}{Z_{b2}^3} + \ldots + \frac{N_{bQ} \cdot S_{bQ}}{Z_{bQ}^3}\right) = 0 \qquad \text{(Equation 6)}$$

The equation above is generalized for a system with one main receiver tensor and Q bucking receiver tensors. In the case of the example induction tool 120 shown in FIG. 2, the system may solve the following equation:

$$\frac{N_m \cdot S_m}{Z_m^3} - \frac{N_{b1} \cdot S_{b1}}{Z_{b1}^3} - \frac{N_{b2} \cdot S_{b2}}{Z_{b2}^3} = 0 \qquad \text{(Equation 7)}$$

In certain example implementations, the cross-sectional areas of the coils may be equal. In such an implementation, using Equation (1), Equations (5) and (7) may be rewritten as:

$$N_m - N_{b1} \cdot e^{\left(\frac{Z_m - Z_{b1}}{Z_0}\right)} - N_{b2} \cdot e^{-\left(\frac{Z_{b2} - Z_m}{Z_0}\right)} = 0 \qquad \text{(Equation 8)}$$

$$\frac{N_m}{Z_m^3} - \frac{N_{b1}}{Z_{b1}^3} - \frac{N_{b2}}{Z_{b2}^3} = 0 \qquad \text{(Equation 9)}$$

In certain implementations, $Z_m$ may be between several inches to hundreds of inches while $N_m$ may be between one and hundreds of turns. Other constraints may be added to this set of equations, such as one or more of the following:

$$0 < \frac{Z_{b1}}{Z_m} < 1, \qquad \text{(Equation 10a)}$$

$$1 < \frac{Z_{b2}}{Z_m} < 2. \qquad \text{(Equation 10b)}$$

Once $Z_m$ and $N_m$ are fixed, Equations (8) and (9) may be simultaneously satisfied by adjusting $Z_{b1}$, $Z_{b2}$, $N_{b1}$ and $N_{b2}$. $Z_0$ is a formation-related parameter that may represent the rate at which the borehole current decays along the borehole axis. In certain implementations, $Z_0$ may be set to a fixed value (e.g., $Z_0 = 5Z_m$).

In one example system for selecting the coil parameters to minimize the sensitivity to borehole current (405) and minimize direct coupling between reception tensors and transmission tensors (block 410), a main receiver tensor 215 may have the following properties $Z_m = 40$ in., $N_m = 70$. In one example system, the locations and number of turns of coils in of the bucking receivers 210 and 220 may be set to $Z_{b1} = (40-10) = 30$ inches and $Z_{b2} = (40+10) = 50$ inches. In the example system, solving for Equations (7) and (9) provides the solutions $N_{b1} = -17.912$, $N_{b2} = -53.793$.

Equations (7) and (9) may be underdetermined because they include six variables ($Z_m$, $N_m$, $Z_{b1}$, $N_{b1}$, $Z_{b2}$, $N_{b2}$), with only two equations to solve for the variables. Therefore, there may be an infinite number of solutions.

Figure 9:
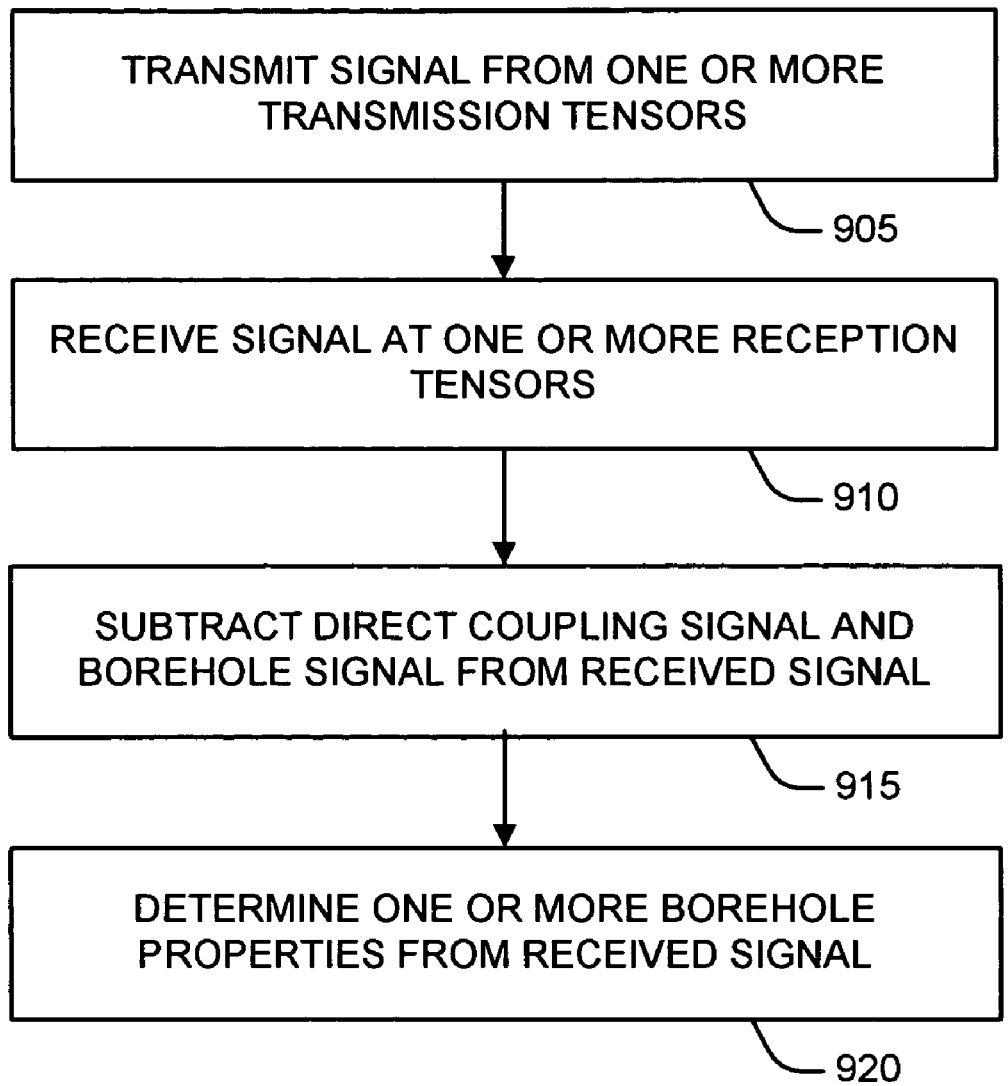
FIG. 9 is a block diagram of an example system for determining one or more borehole properties.

FIG. 9 shows an example system for measuring one or more borehole properties using a logging induction tool, such as induction tool 120. The system may transmit a signal from one or more transmission tensors (block 905). One or more reception tensors may receive the signal (block 910). The system subtracts out the direct coupling signal and the borehole signal from the signal (block 915). The system may determine one or more borehole and formation properties from the signal (block 920). For example, the system may determine one or more of the following: the formation conductivity, the electric anisotropy in the formation around the borehole 125, the relative dip of the formation, and the strike angles between the borehole and the formation.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method of measuring one or more borehole and formation properties, the method comprising:
   providing a logging tool comprising three or more reception tensors and only one corresponding transmission tensor in a borehole, where the three or more reception tensors comprise at least a main tensor and a set of bucking tensors, where each of the three or more reception tensors is characterized by a distance from that tensor to the transmission tensor, where each of the three or more reception tensors and the only one corresponding transmission tensor includes one or more coils, where each coil has a coil axis and is characterized by coil parameters including:
   an axis orientation;
   a cross-sectional area;
   a number of turns;
   where one or more of the coil parameters of the three or more reception tensors are selected to minimize sensitivity to borehole current, at least in part, by configuring the tensors of the three or more reception tensors to satisfy a first equation to balance at least a main tensor pro and a set of bucking tensor products, where:
     each main tensor product is a product of borehole current induced in at least one coil of the at least a main tensor, the cross-sectional area of the at least one coil of the at least a main tensor, and the number of turns of the at least one coil of the at least a main tensor; and
     each bucking tensor product is a product of borehole current induced in at least one coil of one of the set of bucking tensors, the cross-sectional area of the at least one coil of one of the set of bucking tensors, and the number of turns of the at least one coil of one of the set of bucking tensors; and
   where one or more of the cross-sectional area and the number of turns of one or more of the coils of the three or more reception tensors, and the distance from one of the three or more reception tensors to the only one corresponding transmission tensor, is selected to minimize direct coupling between the only one corresponding transmission tensor and one or more of the three or more reception tensors;
   transmitting a set of signals with the transmission tensor;
   receiving a corresponding set of signals with one or more of the three or more reception tensors; and
   determining one or more borehole and formation properties based on the corresponding set of signals received by one or more of the three or more reception tensors.

2. The method of claim 1, where the borehole is in a formation, and where the determining one or more borehole and formation properties based on the corresponding set of signals received by one or more of the three or more reception tensors comprises:
   determining an electric anisotropy of the formation; and
   determining formation conductivity in different directions.

3. The method of claim 1, where the borehole is in a formation, and where the determining one or more borehole and formation properties based on the corresponding set of signals received by one or more of the three or more reception tensors comprises:
   determining a relative dip of the formation.

4. The method of claim 1, where the borehole is in a formation, and where the determining one or more borehole and formation properties based on the corresponding set of signals received by one or more of the three or more reception tensors comprises:
   determining a strike angle between the borehole and the formation.

5. The method of claim 1, where the borehole current at a location z induced by the only one corresponding transmission tensor is characterized by the equation:

$$I(z) \propto e^{-\left(\frac{z}{z_0}\right)},$$

where $I(z)$ is the borehole current induced at location z and $z_0$ is a characteristic length of exponential attenuation.

6. The method of claim 5, where the borehole is in a formation characterized by a formation conductivity at z, where the borehole comprises drilling fluid characterized by a drilling fluid conductivity at z, and where the characteristic length of the exponential attenuation is a square root of a ratio of the drilling fluid conductivity divided by the formation conductivity.

7. The method of claim 5, where the receiving the corresponding set of signals with one or more of the three or more reception tensors comprises:
   receiving a set of borehole signals at z due to the borehole current, where at least one of the set of borehole signals is characterized by the equation:
   $\Delta V \propto I(z) \cdot N_R \cdot S_R$, where $\Delta V$ is one of the set of borehole signals, $N_R$ is the number of turns of at least one of the coils of the three or more reception tensors, and $S_R$ is a cross-sectional area of at least one of the coils of the three or more reception tensors.

8. The method of claim 7, where the receiving the corresponding set of signals with one or more of the three or more reception tensors further comprises:
   receiving one or more of the borehole signals with the at least a main tensor;
   receiving one or more of the borehole signals with the set of bucking tensors;
   wherein the one or more of the borehole signals received with the at least a main tensor are approximately equal to the one or more of the borehole signals received with the set of bucking tensors.

9. The method of claim 8, where the receiving the corresponding set of signals with one or more of the three or more reception tensors further comprises:
   subtracting at least one of the one or more of the borehole signals received by the set of bucking tensors from at least one of the one or more of the borehole signals received by the main tensor.

10. The method of claim 8, where the selection of one or more of the cross-sectional area and the number of turns of one or more of the coils of the three or more reception tensors, and the distance from one of the three or more reception tensors to the only one corresponding transmission tensor to minimize direct coupling between the only one corresponding transmission tensor and one or more of the three or more reception tensors is based, at least in part, on configuring one of the three or more reception tensors to satisfy a second equation to balance at least a main tensor result and a set of bucking tensor results, where:

each main tensor result is a product of the cross-sectional area of the at least one coil of the at least a main tensor and the number of turns of the at least one coil of the at least a main tensor divided by a cubed distance between the at least a main tensor and one of the set of bucking tensors; and each bucking tensor result is a product of the cross-sectional area of at least one coil of one of the set of bucking tensors and the number of turns of at least one coil of one of the set of bucking tensors divided by a cubed distance between the at least a main tensor and one of the set of bucking tensors.

11. The method of claim 1, where the selection of one or more of the cross-sectional area and the number of turns of one or more of the coils of the three or more reception tensors, and the distance from one of the three or more reception tensors to the only one corresponding transmission tensor, to minimize direct coupling between the only one corresponding transmission tensor and one or more of the three or more reception tensors is based, at least in part, on configuring one of the three or more reception tensors to satisfy a second equation to balance at least a main tensor result and a set of second bucking tensor results, where:

each main tensor result is a product of the cross-sectional area of the at least one coil of the at least a main tensor and the number of turns of the at least one coil of the at least a main tensor divided by a cubed distance between the at least a main tensor and one of the set of bucking tensors; and each bucking tensor result is a product of the cross-sectional area of at least one coil of one of the set of bucking tensors and the number of turns of at least one coil of one of the set of bucking tensors divided by a cubed distance between the at least a main tensor and one of the set of bucking tensors.

12. A method of designing a logging tool for use in a borehole, the method comprising:

determining a configuration of a logging tool comprising three or more reception tensors and only one corresponding transmission tensor in a borehole, where the three or more reception tensors comprise at least a main tensor and a set of bucking tensors, where each of the three or more reception tensors is characterized by a distance from that tensor to the transmission tensor, where each of the three or more reception tensors and the only one corresponding transmission tensor includes one or more coils, where each coil has a coil axis and is characterized by coil parameters including:

an axis orientation;
a cross-sectional area;
a number of turns;

where one or more of the coil parameters of the three or more reception tensors are selected to minimize sensitivity to borehole current, at least in part, by configuring the tensors of the three or more reception tensors to satisfy a first equation to balance at least a main tensor product and a set of bucking tensor products, where:

each main tensor product is a product of borehole current induced in at least one coil of the at least a main tensor, the cross-sectional area of the at least one coil of the at least a main tensor, and the number of turns of the at least one coil of the at least a main tensor; and each bucking tensor product is a product of borehole current induced in at least one coil of one of the set of bucking tensors, the cross-sectional area of the at least one coil of the set of bucking tensors, and the number of turns of the at least one coil of one of the set of bucking tensors; and where one or more of the cross-sectional area and the number of turns of one or more of the coils of the three or more reception tensors, and the distance from one of the three or more reception tensors to the only one corresponding transmission tensor, is selected to minimize direct coupling between the only one corresponding transmission tensor and one or more of the three or more reception tensors;

wherein the determining is performed by a computer.

13. The method claim 12, where one or more of the tensors include three coils, where the coil axes are substantially orthogonal to each other.

14. The method of claim 12, where the selecting one or more of the coil parameters to minimize sensitivity to borehole current further comprises:

determining a set of borehole signals induced in one or more of the three or more reception tensors.

15. The method of claim 14, where the determining the set of borehole signals induced in one or more of the three or more reception tensors further comprises:

characterizing the borehole current at a location z induced by the only one corresponding transmission tensor by the equation:

$$I(z) \propto e^{-\left(\frac{z}{z_0}\right)},$$

where $I(z)$ is the borehole current induced at location z and where $z_0$ is a characteristic length of exponential attenuation.

16. The method of claim 15, where the borehole is in a formation characterized by a formation conductivity at z, where the borehole comprises drilling fluid characterized by a drilling fluid conductivity at z, and where the characteristic length of the exponential attenuation is a square root of a ratio of the drilling fluid conductivity divided by the formation conductivity.

17. The method of claim 16, where the determining the set of borehole signals induced in one or more of the three or more reception tensors further comprises:

characterizing at least one of the set of borehole signals received by one of the three or more reception tensors at z due to the borehole by the equation $\Delta V \propto I(z) \cdot N_R \cdot S_R$, where $\Delta V$ is one of the set of the borehole signals, $N_R$ is a number of turns of at least one of the coils of the three or more reception tensors, and $S_R$ is a cross-sectional area of at least one of the coils of the three or more reception tensors.

18. The method of claim 16, where the selecting one or more of the coil parameters to minimize sensitivity to borehole current comprises:

selecting one or more of the coil parameters of one or more coils of the three or more reception coils to minimize sensitivity to borehole current so that at least one of the set of borehole signals received by the at least a main tensor are approximately equal to at least one of the set of borehole signals received by the set of bucking tensors.

19. The method of claim 18, further comprising:
designing wiring between the at least a main tensor and the set of bucking tensors to subtract at least one of the set of borehole signals received by one or more of the set of bucking tensors from at least one of the set of borehole signals received by the at least a main tensor.

20. A non-transitory computer-readable medium having a computer program stored thereon, for determining one or more borehole and formation properties, based, at least in part, on a set of measurements from a logging tool comprising three or more reception tensors and only one corresponding transmission tensor in a borehole, where the three or more reception tensors comprise at least a main tensor and a set of bucking tensors, where each of the three or more reception tensors is characterized by a distance from that tensor to the transmission tensor, where each of the three or more reception tensors and the only one corresponding transmission tensor includes one or more coils, where each coil has a coil axis and is characterized by coil parameters including:
an axis orientation;
a cross-sectional area;
a number of turns;
where one or more of the coil parameters of the three or more reception tensors are selected to minimize sensitivity to borehole current, at least in part, by configuring the tensors of the three or more reception tensors to satisfy a first equation to balance at least a main tensor product and a set of bucking tensor products, where:
each main tensor product is a product of borehole current induced in at least one coil of the at least a main tensor, the cross-sectional area of the at least one coil of the at least a main tensor, and the number of turns of the at least one coil of the at least a main tensor; and
each bucking tensor product is a product of borehole current induced in at least one coil of one of the set of bucking tensors, the cross-sectional area of the at least one coil of one of the set of bucking tensors, and the number of turns of the at least one coil of one of the bucking tensors; and
where one or more of the cross-sectional area and the number of turns of one or more of the coils of the three or more reception tensors, and the distance from one of the three or more reception tensors to the only one corresponding transmission tensor is selected to minimize direct coupling between the only one corresponding transmission tensor and one or more of the three or more reception tensors;
the computer program comprising executable instructions that cause a computer to:
perform the selecting one or more of the coil parameters of the three or more reception tensors are minimize sensitivity to borehole current;
perform the selecting one or more of the cross-sectional area and the number of turns of one or more of the coils of the three or more reception tensors, and the distance from one of the three or more reception tensors to the only one corresponding transmission tensor to minimize direct coupling;
cause the transmission of a set of signals with the only one corresponding transmission tensor;
cause the reception of a corresponding set of signals with one or more of the three or more reception tensors; and determine the one or more borehole and formation properties based on the corresponding set of signals received by one or more of the three or more reception tensors.

21. The non-transitory computer-readable medium of claim 20, where the borehole is in a formation, and where the executable instructions that cause the computer to determine the one or more borehole and formation properties based on the corresponding set of signals received by one or more of the three or more reception tensors further cause the computer to:
determine an electric anisotropy of the formation; and
determine formation conductivity in different directions.

22. The non-transitory computer-readable medium of claim 20, where the borehole is in a formation, and where the executable instructions that cause the computer to determine the one or more borehole and formation properties based on the corresponding set of signals received by one or more of the three or more reception tensors further cause the computer to:
determine a relative dip of the formation.

23. The non-transitory computer-readable medium of claim 20, where the borehole is in a formation, and where the executable instructions that cause the computer to determine the one or more borehole and formation properties based on the corresponding set of signals received by one or more of the three or more reception tensors further cause the computer to:
determine a strike angle between the borehole and the formation.

24. The non-transitory computer-readable medium of claim 20, where the borehole current at a location z induced by the only one corresponding transmission tensor is characterized by the equation:

$$I(z) \propto e^{-\left(\frac{z}{z_0}\right)},$$

where $I(z)$ is the borehole current induced at location z and $z_0$ is a characteristic length of exponential attenuation.

25. The non-transitory computer-readable medium of claim 24, where the borehole is in a formation characterized by a formation conductivity at z, where the borehole comprises drilling fluid characterized by a drilling fluid conductivity at z, and where the characteristic length of the exponential attenuation is a square root of a ratio of the drilling fluid conductivity divided by the formation conductivity.

26. The non-transitory computer-readable medium of claim 24, where the executable instructions that cause the computer to receive the corresponding set of signals with one or more of the three or more reception tensors further cause the computer to:
receive a set of borehole signals at z due to the borehole current, where at least one of the set of borehole signals is characterized by the equation:
$\Delta V \propto I(z) \cdot N_R \cdot S_R$, where $\Delta V$ is one of the set of the borehole signals, $N_R$ is the number of turns of one or more coils of one or more of the three or more reception tensors, and $S_R$ is the cross-sectional area of one or more coils of one or more of the three or more reception tensors.

27. The non-transitory computer-readable medium of claim 26, where the executable instructions that cause the computer to receive the corresponding set of signals with one or more of the three or more reception tensors further cause the computer to:

receive at least one of the set of borehole signals with the at least a main tensor that are approximately equal to at least one of the set of borehole signals received by one or more of the set of bucking tensors.

28. The non-transitory computer-readable medium of claim 27, where the executable instructions that cause the computer to receive the corresponding set of signals with one or more of the three or more reception tensors further cause the computer to:
subtract the at least one of the set of borehole signals received by one or more of the set of bucking tensors from the at least one of the set of borehole signals received by the at least a main tensor.

29. A non-transitory computer-readable medium, having a computer program stored thereon for designing a logging tool for use in a borehole, the computer program including executable instructions that cause a computer to:
determine a configuration of a logging tool comprising three or more reception tensors and only one corresponding transmission tensor in a borehole, where the three or more reception tensors comprise at least a main tensor and a set of bucking tensors, where each of the three or more reception tensors is characterized by a distance from that tensor to the transmission tensor, where each of the three or more reception tensors and the only one corresponding transmission tensor includes one or more coils, where each coil has a coil axis and is characterized by coil parameters including:
an axis orientation:
a cross-sectional area
a number of turns;
where one or more of the coil parameters of the three or more reception tensors are selected to minimize sensitivity to borehole current, at least in part, by configuring the tensors of the three or more reception tensors to satisfy a first equation to balance at least a main tensor product and a set of bucking tensor products, where:
each main tensor product is a product of borehole current induced in at least one coil of the at least a main tensor, the cross-sectional area of the at least one coil of the at least a main tensor, and the number of turns of the at least one coil of the at least a main tensor; and
each bucking tensor product is a product of borehole current induced in at least one coil of one of the set of bucking tensors, the cross-sectional area of the at least one coil of one of the set of bucking tensors, and the number of turns of the at least one coil of one of the bucking tensors; and
where one or more of the cross-sectional area and the number of turns of one or more of the coils of the three or more reception tensors, and the distance from one of the three or more reception tensors to the only one corresponding transmission tensor is selected to minimize direct coupling between the only one corresponding transmission tensor and one or more of the three or more reception tensors.

30. The non-transitory computer-readable medium of claim 29, where one or more of the tensors include three coils, where the coil axes are substantially orthogonal to each other.

31. The non-transitory computer-readable medium of claim 29, the computer program comprising further executable instructions that cause the computer to:
determine a set of borehole signals induced in one or more of the three or more reception tensors.

32. The non-transitory computer-readable medium of claim 31, where the executable instructions to determine the set of borehole signals induced in one or more of the three or more reception tensors further cause the computer to:
characterize the borehole current at a location z induced by the only one corresponding transmission tensor by the equation $$I(z) \propto e^{-(\frac{z}{z_0})},$$

where I(z) is the borehole current induced at location z and where $z_0$ is a characteristic length of exponential attenuation.

33. The non-transitory computer-readable medium of claim 32, where the borehole is in a formation characterized by a formation conductivity at z, where the borehole comprises drilling fluid characterized by a drilling fluid conductivity at z, and where the characteristic length of the exponential attenuation is a square root of a ratio of the drilling fluid conductivity divided by the formation conductivity.

34. The non-transitory computer-readable medium of claim 33, where the executable instructions that cause the computer to determine the set of borehole signals induced in one or more of the three or more reception tensors further cause the computer to:
characterize at least one of the set of borehole signals received by one or more of the three or more reception tensors at z due to the borehole by the equation $\Delta V \propto I(z) \cdot N_R \cdot S_R$, where $\Delta V$ is at least one of the set of borehole signals, $N_R$ is the number of turns of at least one of the coils of at least one of the three or more reception tensors, and $S_R$ is the cross-sectional area of at least one of the coils of the three or more reception tensors.

35. The note-transitory computer-readable medium of claim 33, the computer program comprising further executable instructions that cause the computer to:
select one or more of the coil parameters of the three or more reception tensors so that at least one of the set of borehole signals received by the at least a main tensor is approximately equal to at least one of the set of borehole signals received by at least one of the set of bucking tensors.

36. The non-transitory computer-readable medium of claim 35, the computer program comprising further executable instructions that cause the computer to:
design wiring coupling the at least a main tensor with the set of bucking tensors to subtract the at least one of the set of borehole signals received by at least one of the set of bucking tensors from the at least one of the set of borehole signals received by the at least a main tensor.

37. The non-transitory computer-readable medium of claim 29, where the selection of one or more of the cross-sectional area and the number of turns of one or more of the coils of the three or more reception tensors, and the distance from one of the three or more reception tensors to the only one corresponding transmission tensor, to minimize direct coupling between the only one corresponding transmission tensor and one or more of the three or more reception tensors is based, at least in part, on configuring one of the three or more reception tensors to satisfy a second equation to balance at least a main tensor result and a set of second bucking tensor results, where:
each main tensor result is a product of the cross-sectional area of the at least one coil of the at least a main tensor and the number of turns of the at least one coil of the at least a main tensor divided by a cubed distance between the at least a main tensor and one of the set of bucking tensors; and each bucking tensor result is a product of the cross-sectional area of the at least one coil of one of the set of bucking tensors and the number of turns of at least one coil of one of the set of bucking tensors divided by a cubed distance between the at least a main tensor and one of the set of bucking tensors.

* * * * *